US011221932B2

(12) United States Patent
Viggers et al.

(10) Patent No.: US 11,221,932 B2
(45) Date of Patent: *Jan. 11, 2022

(54) METHODS AND SYSTEMS FOR MONITORING THE INTEGRITY OF A GPU

(71) Applicant: Channel One Holdings Inc., Tampa, FL (US)

(72) Inventors: Stephen Viggers, Waterloo (CA); Tomislav Malnar, Waterloo (CA); Sherwyn R. Ramkissoon, Waterloo (CA); Gregory J. Szober, Waterloo (CA); Aidan Fabius, Waterloo (CA); Kenneth Wenger, Waterloo (CA); John McCormick, Waterloo (CA)

(73) Assignee: Channel One Holdings Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,035

(22) Filed: Aug. 11, 2020

(65) Prior Publication Data

US 2021/0042203 A1 Feb. 11, 2021

Related U.S. Application Data

(63) Continuation of application No. 16/193,344, filed on Nov. 16, 2018, now Pat. No. 10,776,235, which is a (Continued)

(51) Int. Cl.
*G06F 11/00* (2006.01)
*G06F 11/263* (2006.01)
(Continued)

(52) U.S. Cl.
CPC ........ *G06F 11/263* (2013.01); *G06F 11/0733* (2013.01); *G06F 11/0739* (2013.01);
(Continued)

(58) Field of Classification Search
CPC ............ G06F 11/0733; G06F 11/2221; G06F 11/2236
See application file for complete search history.

(56) References Cited

U.S. PATENT DOCUMENTS

| 8,933,934 B1* | 1/2015 | Hill | ........................... G06T 1/20 345/426 |
| 10,169,840 B2 | 1/2019 | Viggers | |

(Continued)

FOREIGN PATENT DOCUMENTS

WO   2015008104   1/2015

OTHER PUBLICATIONS

Gartlan, Michael, "European Search Report", dated Apr. 18, 2017 for application No. 16205094.2, European Patent Office, Munich, Germany.

*Primary Examiner* — Charles Ehne
(74) *Attorney, Agent, or Firm* — Woods Oviatt Gilman LLP; Dennis B. Danella, Esq.

(57) ABSTRACT

Methods and systems for monitoring the integrity of a graphics processing unit (GPU) are provided. The method comprises the steps of determining a known-good result associated with an operation of the GPU, and generating a test image comprising a test subject using the operation of the GPU, such that the test subject is associated with the known-good result. The test image is written to video memory, and the known-good result is written to system memory. Subsequently, the test subject from the test image is transferred from video memory to system memory. The test subject in the system memory is compared with the known-good result in system memory. If the test subject does not match the known-good result, then a conclusion is drawn that the integrity of the GPU has been compromised.

20 Claims, 6 Drawing Sheets

Related U.S. Application Data continuation of application No. 15/383,338, filed on Dec. 19, 2016, now Pat. No. 10,169,179.

(60) Provisional application No. 62/269,619, filed on Dec. 18, 2015.

(51) Int. Cl.
| | |
|---|---|
| *G09G 3/00* | (2006.01) |
| *G06T 1/20* | (2006.01) |
| *G09G 5/36* | (2006.01) |
| *G06T 7/00* | (2017.01) |
| *G06F 11/07* | (2006.01) |
| *G06F 11/22* | (2006.01) |
| *G06T 1/60* | (2006.01) |

(52) U.S. Cl.
CPC ...... *G06F 11/2221* (2013.01); *G06F 11/2236* (2013.01); *G06T 1/20* (2013.01); *G06T 1/60* (2013.01); *G06T 7/0002* (2013.01); *G09G 3/006* (2013.01); *G09G 5/363* (2013.01); *G06T 2207/30168* (2013.01); *G09G 2330/12* (2013.01)

(56) References Cited

U.S. PATENT DOCUMENTS

| | | | |
|---|---|---|---|
| 2005/0276514 A1* | 12/2005 | Fisher | G06T 7/001 382/286 |
| 2010/0070648 A1* | 3/2010 | Zhu | G06F 11/3414 709/235 |
| 2017/0154402 A1* | 6/2017 | Viggers | G06T 1/20 |

* cited by examiner

METHODS AND SYSTEMS FOR MONITORING THE INTEGRITY OF A GPU

RELATED APPLICATIONS

This application is a continuation of U.S. patent application Ser. No. 16/193,344 filed Nov. 16, 2018, which is a continuation of U.S. patent application Ser. No. 15/383,338 filed Dec. 19, 2016, which claims the benefit of U.S. Provisional Patent Application No. 62/269,619 filed Dec. 18, 2015, the entire contents of which are hereby incorporated by reference herein for all purposes.

TECHNICAL FIELD

The embodiments disclosed herein relate to monitoring a Graphics Processing Unit (GPU) in rendering computer graphics and, in particular, to methods and systems for monitoring a subset of GPU components used by graphical applications in safety-critical environments, such as in aviation.

INTRODUCTION

The following paragraphs are not an admission that anything discussed in them is prior art or part of the knowledge of persons skilled in the art.

GPUs generally include multiple subsystems. Occasionally, GPU subsystems may stop operating according to their desired operation. In particular, graphical applications may use various subsystems of the GPU to draw an image. However, graphical applications may not use all subsystems of the GPU.

Graphical applications running in a safety-critical environment may require assurances that an image created by the GPU corresponds to the image that the graphical applications actually intended.

The Certification Authorities Software Team (CAST) released its position paper CAST-29 titled "Use of COTS Graphical Processors (CGP) in Airborne Display Systems" in February 2007. This paper stated that "one of the primary concerns involved in the development of an airborne display system is the potential for displaying Hazardously Misleading Information (HMI) of the flight crew. HMI could come in the form of incorrect or missing flight deck alerts, incorrect navigation or system status information, or "frozen data." If this erroneous information is not flagged as Invalid Data, it could induce the flight crew to make inappropriate and potentially hazardous actions based on that erroneous data, or not take appropriate actions when action is required."

According to the CAST 29 paper, conventional hardware development process are not appropriate. The paper stated "the typical CGP uses multiple embedded microprocessors that are running asynchronously and may contain 30 to 100 million transistors. A CGP cannot therefore be considered a simple device. Verification activities or use of reverse engineering techniques to make these devices DO-254/ED-80 compliant is highly problematic and, most likely, impractical."

However, at the same time, the CAST 29 paper maintained that a CGP should not display HMI. The paper stated "the applicant/system developer should show that the CGP used in the display system cannot display HMI to the level of assurance commensurate with the hazard classification (e.g., Catastrophic, Hazardous, Major) of the HMI in question."

BRIEF DESCRIPTION OF THE DRAWINGS

For a better understanding of the various embodiments described herein, and to show more clearly how these various embodiments may be carried into effect, reference will be made, by way of example only, to the accompanying drawings which show at least one exemplary embodiment, and in which are now described.

Figure 1:
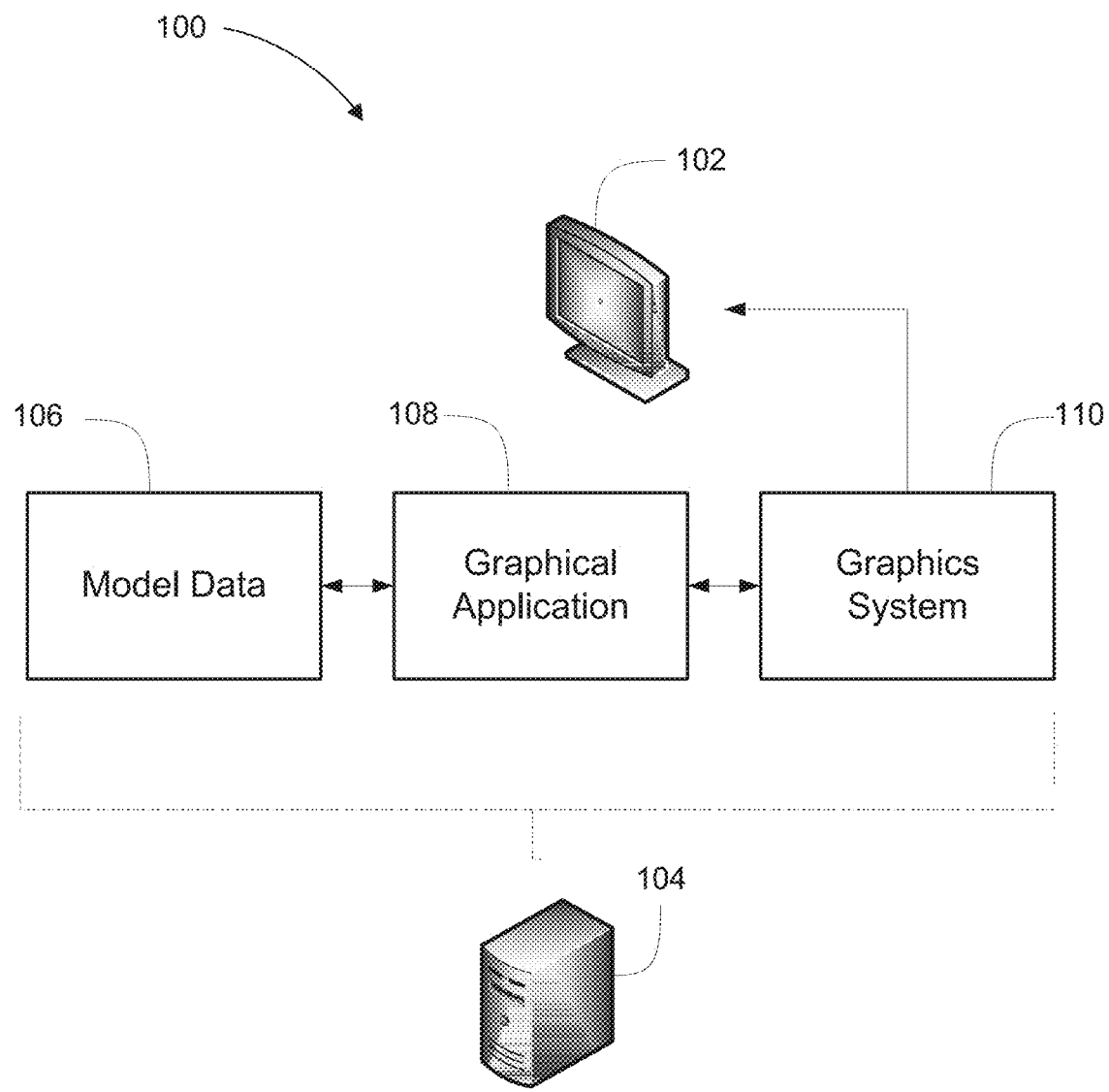
FIG. 1 is a schematic diagram of a host computer system according to at least one embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. This may also include any graphics rendering device that renders 2D or 3D graphics.

The term "CPU", as used herein, broadly refers to a device with the function or purpose of a central processing unit, independent of specific graphics-rendering capabilities, such as executing programs from system memory. In some implementations, it is possible that a SoC may include both a GPU and a CPU; in which case the SoC may be considered both the GPU and the CPU.

Generally, graphical applications running in a safety-critical environment may require assurances that an image created by the GPU corresponds to the image that the graphical applications actually intended.

In some cases, integrity monitors may be used to assure that an image created by the GPU matches the image that a graphical application intended to draw. Some integrity monitors may be implemented by performing tests of the GPU to ensure that the GPU is operating as expected.

In some cases, GPUs will undergo conformance testing. Conformance testing may show that, under normal operation, a GPU will produce expected results. However, conformance testing is typically performed in a testing environment and not in a production environment (i.e., while an aircraft is airborne). Furthermore, conformance test is typically performed on a discrete basis, and not on a continuous basis.

GPUs may also undergo Power-on Built-In-Testing (PBIT). PBIT may test a GPU in a production environment. However, PBIT is normally performed when a GPU is initially powered-on. Because PBIT is performed at initial power-on, PBIT may not detect a failure after initial power-on.

In some cases, GPUs may undergo Continuous Built-In-Testing (CBIT). CBIT may test a GPU on a continuous basis. However, CBIT is typically performed on a limited subset of GPU subsystems. Moreover, CBIT of GPU subsystems may be computationally intensive. Such use of computing resources may reduce the performance of the GPU to unacceptable levels for the graphical application. Thus, the subset of GPU subsystems that may undergo CBIT is generally constrained by performance requirements for the GPU.

Referring now to FIG. 1, illustrated therein is a host computer system 100 according to at least one embodiment. The host computer system 100 comprises a computer display or monitor 102, and a computer 104. Other components of the system are not shown, such as user input devices (e.g., a mouse, a keyboard, etc.). Generally the host computer system 100 may be used for displaying graphics objects or images on the display or monitor 102.

According to at least one embodiment, the host computer system 100 may be a computer system used in a motorized vehicle such as an aircraft, marine vessel, or rail transport vehicle, or in a medical imaging system, a transportation system, or any other system that uses a computer and monitor. In some cases, the computer system may be in use in a safety critical environment.

The computer 104 may generally include system memory, storage media, and a processor. In some cases, the computer 104 may also include dedicated graphics hardware, which may include a graphics system 110 and video memory. In other cases, the computer 104 may perform at least some graphics-related operations using the processor and system memory.

According to at least one embodiment, the host computer system 100 may be a safety-critical, mission-critical, or high-reliability system. In such a case, the host computer system 100 may be required to comply with specific operating standards, such as standards related to reliability and fault tolerance.

In order to display a rendering of the model data 106 on the monitor 102, such as may be determined by a graphical application 108 of the host computer system 100, the model data 106 must first be processed by a graphics system 110. The graphics system 110 may receive the model data 106 and may also receive instructions from the graphical application 108 as to how the model data 106 should be processed.

The graphics system 110 may include any or all of a GPU and video memory, and it may use any or all of the CPU and system memory as well.

Figure 2:
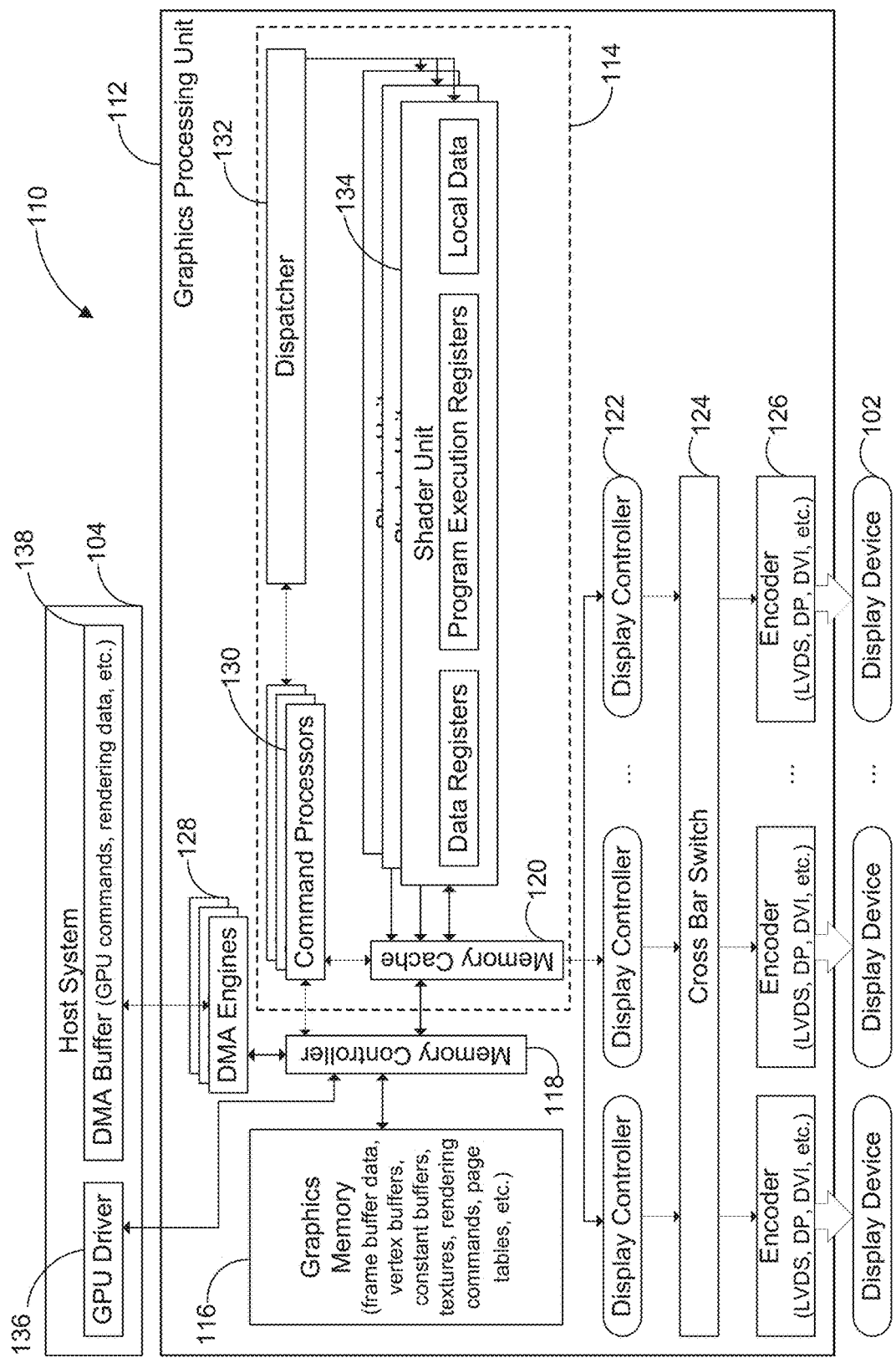
FIG. 2 is a high-level architectural diagram of a graphics system according to at least one embodiment.

Referring now to FIG. 2, illustrated therein is a graphics system 110 according to at least one embodiment. The graphics system 110 may include a GPU 112 and some of the computer 104. In this example the GPU 112 is shown as including graphics memory (sometimes referred to as video memory or VRAM) 116, a memory controller 118, memory cache 120, display controllers 122, a cross-bar switch 124, encoders 126, direct memory access (DMA) engines 128, command processors 130, a dispatcher 132, and shader units 134. Generally, the memory cache 120, command processors 130, dispatcher 132, and shader units 134 may be referred to collectively as a GPU engine 114. The GPU engine 114 may provide GPU subsystems.

Although the GPU 112 in FIG. 2 is shown to include components such as the display controller 122, cross-bar switch 124, and encoders 126, it will be understood that components such as the display controller 122, cross-bar switch 124, and encoders 126 may be logically separate entities from the GPU 112. In particular, the display controller 122, cross-bar switch 124, and encoders 126 may be logically and/or physically separate from the GPU 112.

The graphics system 110 may further include a GPU driver 136 and a DMA buffer 138, which are a part of the computer 104. The memory controller 118 may be coupled to the GPU driver 136. The DMA engines 128 may be coupled to the DMA buffer 138. The DMA buffer 138 may provide commands and rendering data 106 to the DMA engines 128 of the GPU 112.

The graphics memory 116 may store data including, but not limited to, frame buffer data, vertex buffers, constant buffers, textures, rendering commands, page tables. The memory controller 118 may access data stored on the graphics memory 116 and provide data and commands to the GPU engine 114. The GPU engine 114 may process the data and commands and in response, create an image that is provided to the memory controller 118 for storage in the graphics memory 116. The image may include one or more lines, wherein each line includes at least two pixels.

A display controller 122, via the memory controller 118, may extract the image for display from the graphics memory 116. The display controller 122 may convert the image to a display output that is compatible with the display 102. The display output may be provided to the cross bar switch, which in turn, is provided to the encoders 126. The encoders 126 may be coupled to the display 102.

Figure 3:
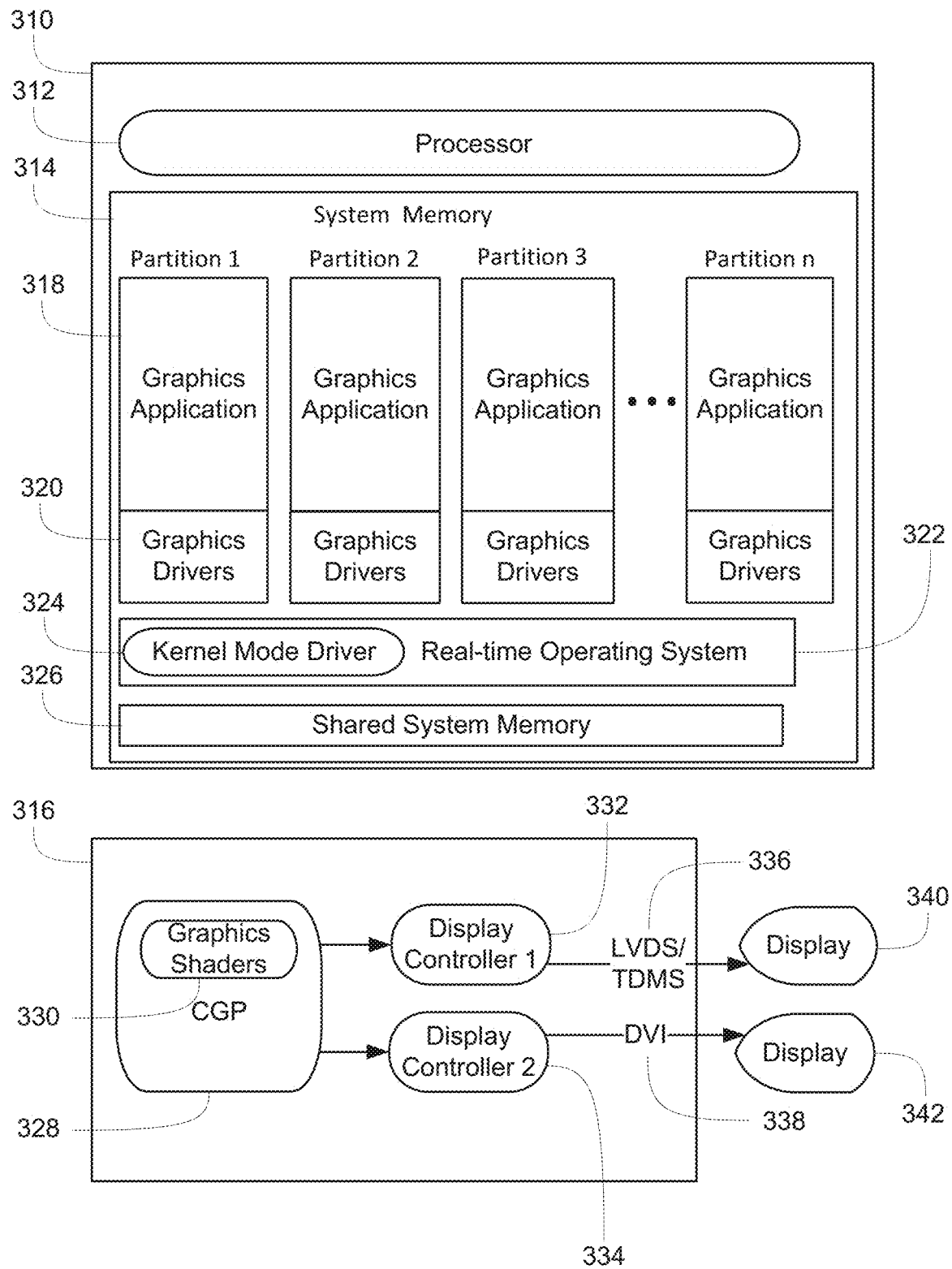
FIG. 3 is a block diagram of a typical display system with a commercial-off-the-shelf (COTS) GPU integrity monitor, according to at least one embodiment.

Referring to FIG. 3, there is shown a software/hardware block diagram of a display system 300 with a COTS GPU ("CGP") integrity monitor that uses software in order to detect the display of hazardously-misleading information ("HMI"). The CGP integrity monitor may be implemented as a stand-alone application, or as part of a display application. For example, the display system may be an avionics display system, and the display application may be a flight display application.

The display system 300 comprises a computer 310, having a processor 312 such as a central-processing unit (CPU) and system memory 314. The computer includes, or may be in communications with a graphics system 316. According to some embodiments, the computer 310 may be a single-board computer, and the graphics system 316 may be connected to the computer 310 by way of a bus such as a PCIe bus.

The system memory 312 may be organized into separate application partitions (referred to as "Partition 1", "Partition 2", "Partition 3", . . . "Partition N"), as well as allocations for a real-time operating system 322 and shared system memory 326.

According to some embodiments, each of the partitions may be used for a particular graphics application such as graphics application 318 accompanied by the requisite graphics driver 320. The graphics driver 320 is configured to operate with a kernel mode driver 324 within the real-time operating system 322.

The graphics system 316 comprises a GPU 328 (e.g. a CGP), which includes graphics shaders 330. The GPU 328 provides input to two display controllers 332, 334, which drive signals via display interfaces 336 and 338 such as LVDS, TDMS, and DVI to the displays 340 and 342. The example of two display controllers and two display interfaces is shown for convenience, and the number of display controllers and display interfaces can vary.

In a display system 300 having a CGP 328 and one or more graphics applications 318, the integrity monitor software runs a GPU health check routine and generates GPU test subjects. According to some embodiments, the test subjects may be pixel data pertaining to test images, the value of a cyclic-redundancy check (CRC) calculated based on a test image, and/or a sequence number included within a test image. The test subject will comprise at least one of these form, and may include any combination of two or more of these forms. The GPU test images may be stand-alone images or be part of a non-visible (e.g. non-display) graphics application image.

According to some embodiments, the GPU test image may embed a sequence number and/or some pixel data generated by executing the GPU 328 in a similar fashion to safety-critical data, such as may be displayed in an avionics display system, an automotive display system, a medical display system, etc.

A graphics application may generate both an image pertaining to the intended function of the graphics application, as well as a test subject. According to some embodiments, the graphics application may be operating in combination with a CGP driver, and the image pertaining to the intended function of the graphics application and the test subject may be written to a frame buffer within the CGP's video memory.

Figure 4:
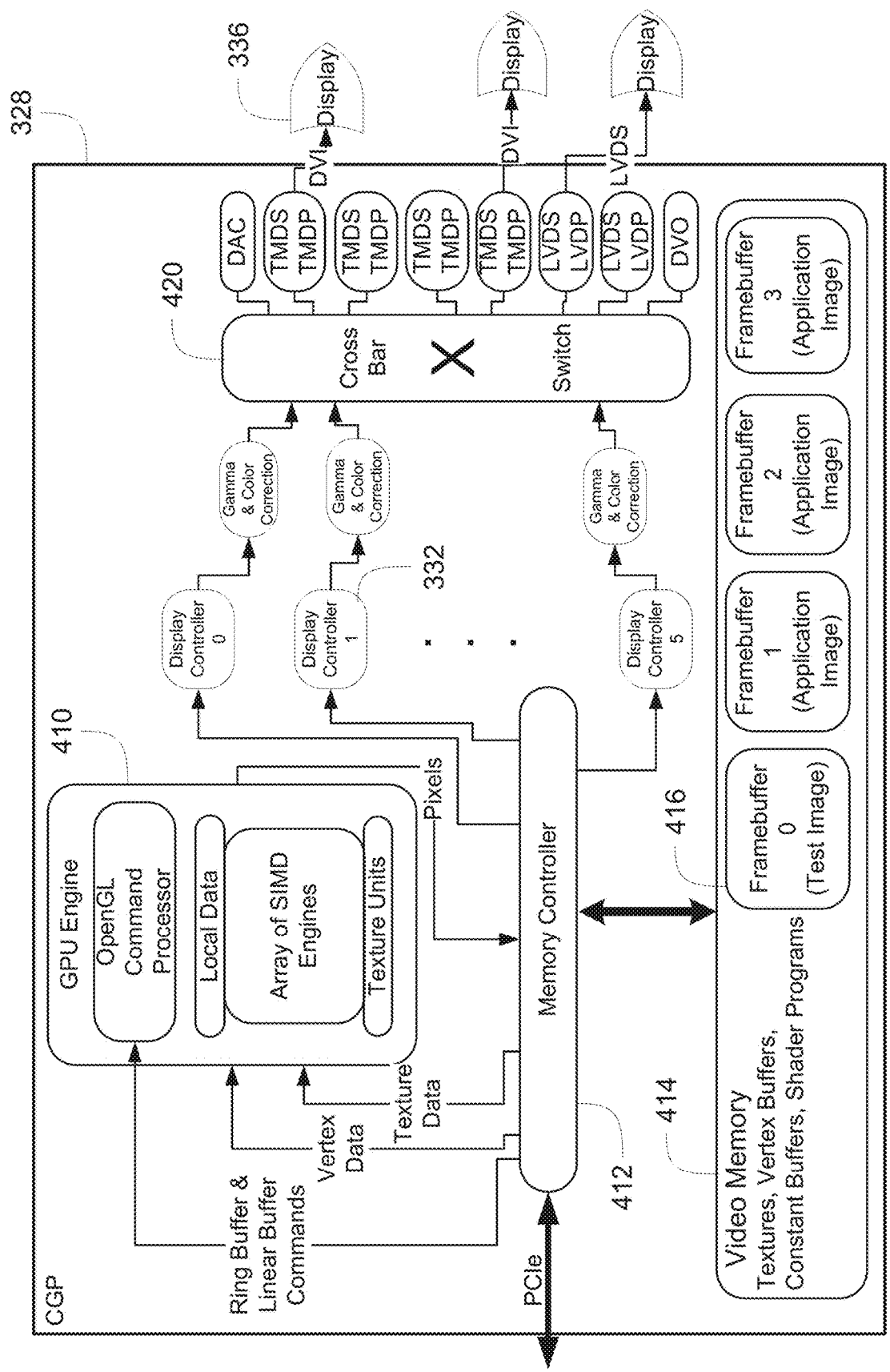
FIG. 4 is a block diagram of a typical COTS GPU (CGP), display controllers, and displays as used with the display system of FIG. 3, according to at least one embodiment.

Subsequently, the integrity monitor software, using the CGP driver, can transfer the test subject from video memory (e.g. frame buffer '0') to the system memory, as is also depicted in FIG. 4.

As described above, the test subject may be a CRC value derived from the test image, or a sequence number embedded within the test image. According to some embodiments, the CRC value and/or sequence number may be computed or extracted from the test image within the video memory (e.g. by the GPU), and then written to the system memory. In other embodiments, the test image may be written to the system memory, and then the CRC value and/or sequence number may be computed or extracted from the test image within the system memory (e.g. by the CPU).

According to some embodiments, the integrity monitor software may extract the sequence number and compare the GPU test image to a known-good result, such as a model image. The integrity monitor software may first determine whether the sequence number has been incremented, and then ensure that the GPU test image matches against known good pixel values of the model image. Once the integrity monitor software compares the GPU test image, it writes a flag indicating the results of the comparison to specific locations in system memory, such as in shared memory, indicating a pass or fail condition. Based on the pass or fail condition written in system memory, the graphics application is able to determine whether the GPU is operating correctly.

According to some embodiments, the test subject may include a general hashing algorithm, for instance a CRC value that can be computed based on a test image, and the known-good result may include the "correct" value that is expected from the CRC computation. For example, the known-good result might be a CRC value that is computed (e.g. at the time of the GPU health check) based on a model image that is associated with the test image, or a known-good result might be a CRC value that has been previously determined for a particular test image such that it is not necessary to consider a model image at the time of the GPU health check.

When the test subject includes a CRC value, and the known-good result includes the "correct" value that is expected from the CRC computation, then the CRC value computed from the test image (i.e. the test subject) can be compared with the expected CRC value (i.e. the known-good result) in order to determine whether the test image was properly generated by the GPU.

In some embodiments, the teachings herein may include the use of other algorithms, such as FNC-1a (i.e., for use with TrueCore).

According to some embodiments, the test subject may include a sequence number, and the known-good result may include the "correct" value of the sequence number, based on a pre-determined sequence and a previous sequence number from a previously-generated test image. For example, if a previously-generated test image included the sequence number "2", and the known sequence was an addition of "1", then the known-good result would include the expected sequence number "3" for the sequence number associated with the next test image.

When the test subject includes a sequence number, and the known-good result includes the "correct" value of the sequence number, then the sequence number extracted from the test image (i.e. the test subject) can be compared with the expected sequence number (i.e. the known-good result) in order to determine whether the test image was properly generated by the GPU.

According to some embodiments, if the comparison of the test subject with the known-good result fails, the graphics application may communicate an error to a user (e.g. an airplane pilot using an avionics display system). For example, the error may be communicated by writing a warning directly to the image in video memory, such that a potentially-faulty GPU can be bypassed, and reliance can be placed on the display controller to relay the error instead. According to some embodiments, an error message may also be conveyed to the display by transmitting an image to the display using external hardware (e.g. an FPGA). According to some embodiments, an error message may be conveyed using other means, such as an annunciator light, an alarm sound, etc.

Referring to FIG. 4, there is shown a GPU 328, such as a CGP. The GPU 328 comprises a GPU engine 410, a memory controller 412, video memory 414, multiple display controllers such as display controller 332, and a cross-bar switch 420 for switching output signals from the display controllers to multiple displays, such as display 340. The video memory 414 comprises multiple frame buffers, such as frame buffer '0' 416. As used herein, "video memory" refers to memory that is accessible by the GPU, which, according to some embodiments, may be a part of system memory, or may be a separate memory from the system memory.

The GPU test images are generated by the GPU engine 410, based on data received from the computer (e.g. computer 310) over a bus (e.g. a PCIe bus) via the memory controller 412. The test images are then stored in a frame buffer (e.g. frame buffer '0' 416) in the video memory 414.

According to some embodiments, the display controllers, such as the display controller 332, are subsequently monitored by reading back key register status values to ensure that the display (e.g. display 340) is being updated.

The CPG integrity monitor software comprises a CGP driver, one or more graphics application programs, and an integrity monitor application.

According to some embodiments, the CGP driver can expose a graphics API such as an OpenGL API or OpenGL SC API, as well as other graphics APIs to application programs, thereby allowing graphics applications to create one or more safety-critical images in video memory.

In some cases, a systems engineer or graphics application developer may need to determine a system action to be taken in the case of the integrity monitor detecting a CGP error. For example, these actions may include: resetting the GPU 328, communicating a message to an application in another display unit to display a message to users (e.g. a flight crew, vehicle operators, etc.), and communicating a message to an annunciator light, and/or an aural warning system in order to annunciate the message to the flight crew.

According to some embodiments, the integrity monitor application program can perform various functions. First, the application program may obtain a model image associated with a known GPU command, and determine a known-good result based on the model image. Then, the application can execute the corresponding GPU commands to generate a test image and the test subject. The application program may also initiate and/or terminate the monitoring of the test image and test subject. Subsequently, the test image and/or test subject may be written from video memory 414 to system memory 314 (e.g. via a PCIe bus), and the test subject may be extracted from the test image.

According to some embodiments, the test image may be written to a non-display region of the video memory. For example, the test image may be written to framebuffer '0' 416, while images pertaining to the intended function of the graphics application may be written to framebuffers '1', '2', etc. In this example, framebuffer '0' is not written to a display 336, and, thus, the test image is not viewable by a user.

According to some embodiments, if the test subject comprises a CRC value and/or sequence number, the application program may also determine if the CRC value and/or sequence number has been generated correctly. For example, this may include determining that the CRC value computed based on the generated test image has the expected value, or that the sequence number has been properly incremented.

Additionally, the application program can compare a test subject comprising test image pixel data against known-good values (e.g. from a known-good result that comprises a model image). Subsequently, the application program can then update an integrity monitor status register in the system memory 314 (e.g. in the shared memory 326), and then manage the errors detected by the integrity monitor software.

During a safety-critical operation, the software CGP integrity monitor can continually test the CGP using a test image that executes CGP graphics operations similar, but not necessarily identical to those of the safety-critical graphics application.

The software integrity monitor operates on the principle that, if the GPU 328 creates the test images (and therefore the test subjects) correctly, a reliable conclusion can be drawn that the GPU 328 is operating correctly, and that all images created by the same GPU (at or about the same time) are also correct. If the GPU 328 fails to create the test image correctly, then an assumption can be made that any of the images pertaining to the intended function of the graphics application may also be erroneous.

The test image and/or test subject may be extracted from video memory 414 by the processor (e.g. CPU) 312, or by the GPU 410 At the same time, the images pertaining to the intended function of the graphics application may be extracted from the video memory 414 by the display controller 332.

The CGP integrity monitor monitors the GPU 328. However, it does not necessarily monitor the color pixel pipeline that includes gamma correction, color conversion, and color correction. Furthermore, it does not necessarily monitor a digital transmitter that the images pertaining to the intended function of the graphics application will subsequently pass through in order to be displayed. In order to address this, a system safety assessment can be performed in order to determine that design and development errors in the display controller 332, the color pixel pipeline, the crossbar switch 420, and the digital transmitters cannot lead to the display of HMI (including a frozen display screen).

In cases where the display controller 332 does not contain a full frame buffer, the analysis is simplified as a complete frame is never stored outside the GPU 328, and therefore, cannot remain displayed and frozen if the GPU 328 is operating correctly.

According to some embodiments, key registers of the display controller 332 can be monitored to ensure that there is updated data being transmitted from the GPU 328.

According to some embodiments, the system safety assessment may also consider gamma and color correction. It may or may not be possible to monitor registers for this portion of the pixel pipeline. However, the system safety assessment may conclude that the gamma and color correction is not able to fail in a way to produce HMI. For example, the analysis may determine whether the gamma or color correction table is malfunctioning, and whether this would affect the entire image and produce a result that would not be obviously incorrect and not misleading.

Figure 5:
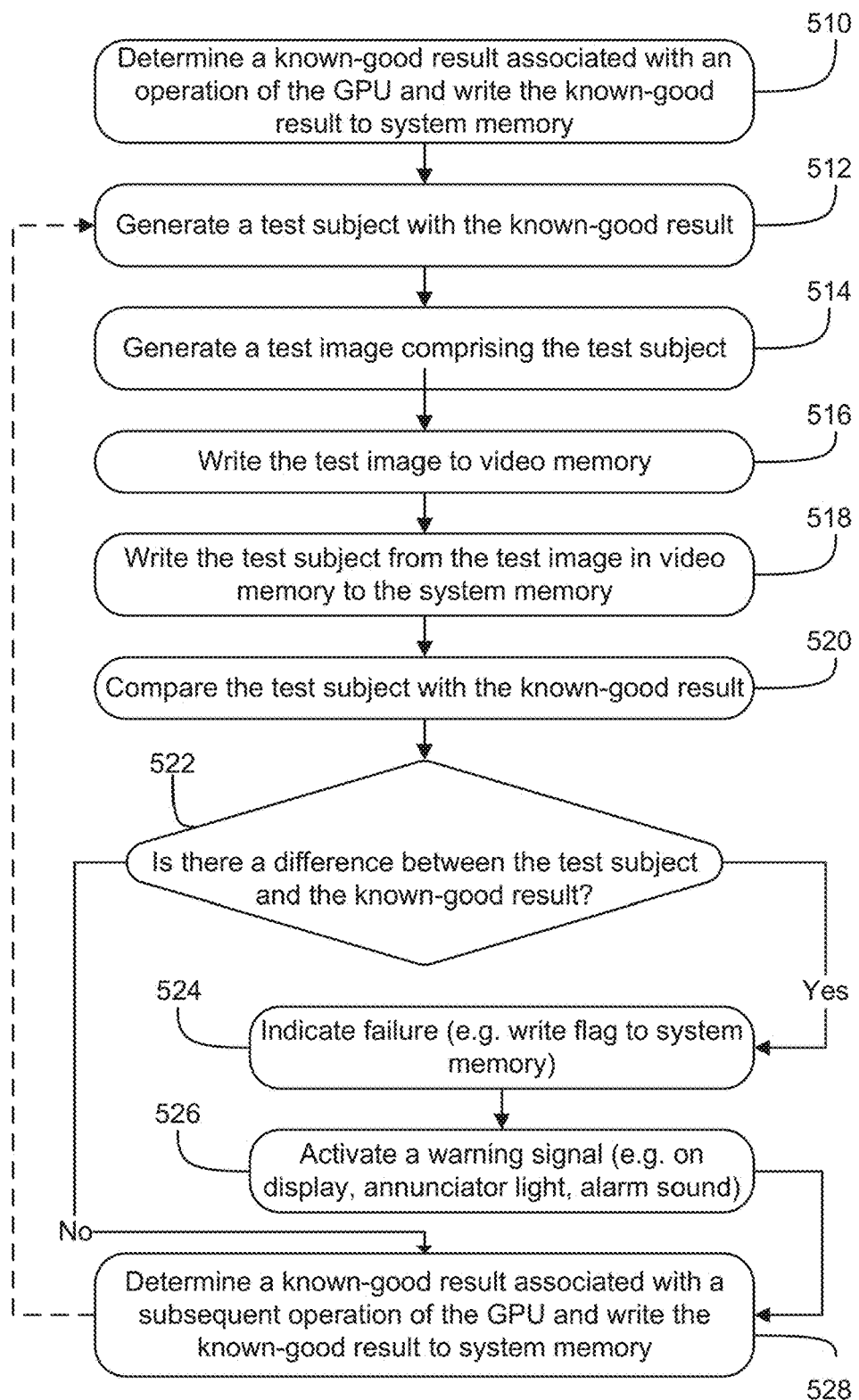
FIG. 5 is a flow diagram of a method for monitoring the integrity of a GPU according to at least one embodiment.

Referring to FIG. 5, there is shown a method 500 for monitoring the integrity of a GPU. The method begins at step 510, when a known-good result associated with an operation of the GPU is determined, and then written to system memory. This can include calculating a known-good result corresponding to the GPU operation, such as known-good values for pixels expected to be produced by the GPU according to the GPU operation (i.e. a model image), or a known-good result corresponding to a CRC value, as previously described.

At step 512, a test subject is generated in association with the known-good result. In other words, the test subject is generated by the GPU according to the same GPU operation on which the known-good result was calculated in step 510.

The test subject is used in the generation of a test image at step 514. According to some embodiments, the test image may be located in a non-display region of the image, such as may be determined by a display area of a display screen, or a non-display region defined in terms of a non-display time. According to some embodiments, the test image may be stored in a non-display region of the video memory (e.g. a frame buffer that is not displayed).

At step 516, the test image (which includes the test subject) is written to video memory. According to some embodiments, the image is written to video memory by the GPU in order for the image to be eventually displayed on the display screen in accordance with the operation of the graphics system, independent of an integrity monitor.

At step 518, the test subject is written from the test image in video memory to the system memory. Writing the test subject to the system memory from the video memory, enables the use of a software integrity monitor, since software can be used to access and analyse the test subject in the system memory rather than having to rely on additional hardware to access and analyze the test subject from video memory, or at the input to or output from a display controller.

According to some embodiments, the test subject (such as a CRC value or sequence) number can be obtained from the test image in video memory, and then written to system memory.

According to some embodiments, the test image may additionally be written to the display screen (e.g. through a display controller) from the video memory. In this way, a test subject can be accessed and analyzed from system memory in real time, as the test image is being displayed on the display screen.

At step 520, the test subject, stored in system memory, is compared with the known-good result, which is also stored in system memory. According to some embodiments, the test subject is expected to be the same as the known-good result, assuming that the integrity of the GPU has been maintained, since the the known-good result is the expected result calculated for the GPU operation, and the test subject is the actual output of the GPU resulting from the GPU operation.

At step 522, the result of the comparison is analyzed based on whether there is a difference between the test subject and the known-good result. According to some embodiments (e.g. if the test subject is expected to match the known-good result), if the comparison indicates that a difference as been detected, then a conclusion is drawn that the integrity of the GPU has been compromised. If the comparison indicates that the test subject and the known-good result are the same, then a conclusion is drawn that the integrity of the GPU has been maintained.

If the comparison of the test subject with the known-good result indicates a difference between the test subject and the known-good result, then the method proceeds to step 524. At step 524, a flag indicating failure (i.e. that the integrity of the GPU has been compromised) is written to the system memory.

According to some embodiments, the method may proceed from step 524 to step 526. At step 526, a graphics application may read the flag indicating failure from the system memory, and then activate a warning signal such as on a display screen, on an annunciator light, or with an alarm sound speaker. In this way, a real-time notification can be provided to a user in order to notify the user that the integrity of the GPU has been compromised.

If, at step 522, it is determined that the test subject matches the known-good result (e.g. that the actual test image resulting from the GPU operation matches the calculated expected result), then the method may proceed to step 528.

At step 528, the method proceeds to a subsequent iteration. This is accomplished by determining a known-good result that corresponds to a subsequent graphics operation, and then iterating the method to step 512.

Figure 6:
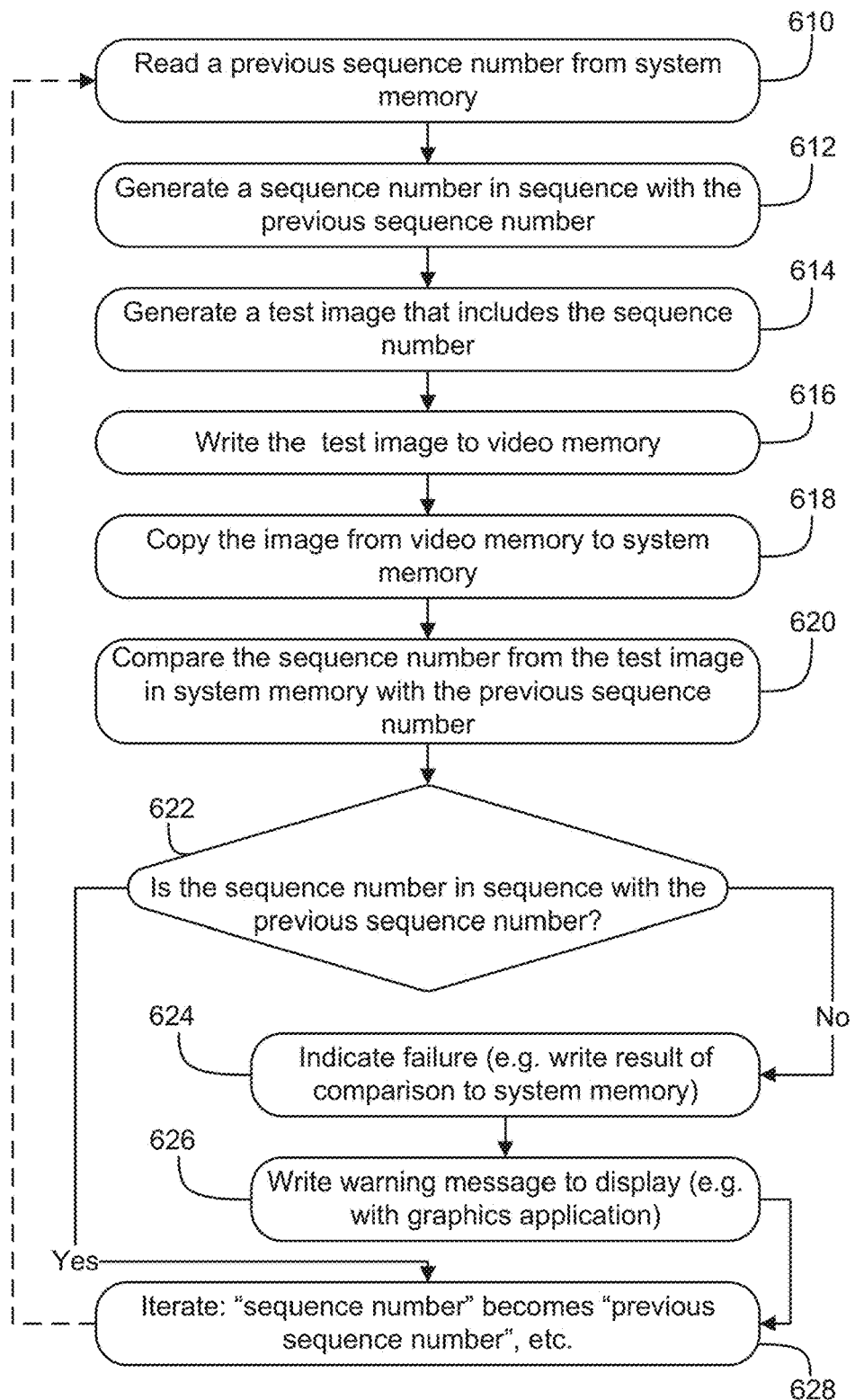
FIG. 6 is a flow diagram of a method for monitoring the integrity of a GPU according to at least one embodiment.

Referring to FIG. 6, there is shown a method 600 for monitoring the integrity of a GPU. Whereas the method 500 shown in FIG. 5 is based on the comparison of a test subject generated by a GPU operation with a known-good result calculated for the GPU operation in order to determine the integrity of the GPU, the method 600 is based on the comparison of a sequence number of a test image with a sequence number of a previous test image.

According to some embodiments, either method 500 or 600 can be implemented on its own or in combination with the other method. For example, it is possible monitor the integrity of the GPU by comparing a test image with a model image, and it is also possible to monitor the integrity of the GPU by including a sequence number in the test image such that the test image can be compared with a model image, and the sequence number can be verified against the sequence number from a previous test image.

The method begins at step 610, when a sequence number corresponding to a previous test image is read from system memory.

At step 612, a sequence number is generated in accordance with a pre-determined sequence. The generated sequence number can be embedded in a test image such that, if the test image produced by the GPU operation does not result in the expected sequence number, then an inference can be drawn with respect to the integrity of the GPU. At step 614, a test image is generated that includes the sequence number.

Once the image has been generated by the GPU, the image is written to video memory at step 616. The image can then be drawn to the display screen from the video memory.

At step 618, the image (which includes the test image and sequence number) is copied from the video memory to the system memory, in the same manner as in step 618.

At step 620, the sequence number from the test image in system memory is compared with the previous sequence number. In other words, the sequence number generated by the GPU as a part of the test image can be compared with a known-good or expected result for the sequence number, since a previous sequence number and the sequence itself are known.

At step 622, the result of the comparison is analyzed based on whether the sequence number generated by the GPU as a part of the test image matches the expected result (e.g. based on a previous sequence number). If the comparison indicates that the sequence number is erroneous, then a conclusion is drawn that the integrity of the GPU has been compromised. If the comparison indicates that the sequence number is correct, then a conclusion is drawn that the integrity of the GPU has been maintained.

If the comparison of sequence number with a previous sequence number indicates that the sequence number was not generated as expected, then the method proceeds to step 624. At step 624, a result indicating failure (i.e. that the integrity of the GPU has been compromised) is written to the system memory.

According to some embodiments, the method may proceed from step 624 to step 626. At step 626, a graphics application may read the result indicating failure from the system memory, and then write a corresponding warning message to the screen. In this way, a real-time notification can be provided to a user in order to notify the user that the integrity of the GPU has been compromised.

If, at step 622, it is determined that the sequence number was generated correctly by the GPU, then the method may proceed to step 628.

At step 628, the method proceeds to a subsequent iteration, such that the current sequence number is now considered as a previous sequence number, and the method iterates to step 610.

In some embodiments, the teachings herein may be direct to a pixel by pixel subtraction technique. For example, one exemplary embodiment may implement TrueCore, in which a test image (e.g., subject) in memory is subjected to a pixel by pixel subtraction, with a known "good result" in system memory.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A system for monitoring integrity of a graphics processing unit (GPU), the system comprising:
a GPU engine of the GPU;
a central processing unit (CPU) in communication with the GPU;
a video memory in communication with the CPU and the GPU;
a system memory in communication with the CPU and the GPU; and wherein
the CPU is arranged to:
determine a known-good result associated with an operation of the GPU, and
instruct the GPU engine to generate a test image that includes a test result; and wherein
the GPU engine is arranged to:
generate the test image including the test result according to the instruction from the CPU, and
write the test image including the test result to the video memory; and
the CPU is further arranged to:
transfer the test image from the video memory to the system memory,
compare the known-good result to the test result, and
write a result to the system memory indicating failure when the comparison indicates that the test result does not match the known-good result.

2. The system of claim 1, wherein the known-good result is pixel data.

3. The system of claim 1, wherein the known-good result is a cyclic-redundancy check value.

4. The system of claim 1, wherein the known-good result comprises an expected sequence number based on a known sequence, and wherein the GPU generates the test image including the test result based on the known sequence.

5. The system of claim 1, wherein the result is a flag written to the system memory.

6. The system of claim 1, wherein the test image is written to a frame buffer in the video memory.

7. The system of claim 6, the system further comprising a display controller, wherein the frame buffer is marked for display by the display controller.

8. The system of claim 6, further comprising a display controller, wherein the frame buffer is not marked for display by the display controller.

9. The system of claim 1, the system further comprising a graphics application stored in the system memory including application code that is executable by the CPU and structured to cause the CPU to be configured to:
determine that an erroneous GPU operation has occurred based on the result; and
activate a warning signal without communicating with the GPU.

10. The system of claim 1, wherein the system further comprises a display controller in communication with the video memory, the CPU and the GPU, and wherein the computer instruction code is further structured to cause the CPU to be configured to:
read a register of a display controller to determine if there is updated data being transmitted from the GPU to the display controller.

11. A method of monitoring integrity of a graphics processing unit (GPU) using a central processing unit (CPU) in communication with the GPU, the method comprising:

generating, by the CPU, a known-good result associated with an operation of the GPU, and instructing a GPU engine of the GPU to generate a test image that includes a test result;

generating, by the GPU engine of the GPU, the test image including the test result according to the instruction from the CPU, and writing the test image including the test result to the video memory; and transferring, by the CPU, the test image from the video memory to a system memory, comparing the known-good result to the test result, and writing a result to the system memory indicating failure when the comparison indicates that the test result does not match the known-good result.

12. The method of claim 11, wherein the known-good result is pixel data.

13. The method of claim 11, wherein the known-good result is a cyclic-redundancy check value.

14. The method of claim 11, wherein the known-good result comprises an expected sequence number based on a known sequence, and wherein the GPU generates the test image including the test result based on the known sequence.

15. The method of claim 11, wherein the result is a flag written to the system memory.

16. The method of claim 11, wherein the test image is written to a frame buffer in the video memory.

17. The method of claim 16, further comprising marking the frame buffer as for display by a display controller.

18. The method of claim 16, further comprising marking the frame buffer as not for display by a display controller.

19. The method of claim 11, further comprising the CPU determining that an erroneous GPU operation has occurred based on the result, and activating a warning signal without communicating with the GPU.

20. A non-transitory computer-readable medium system storing computer program code executable by a graphics processing unit (GPU) and a central processing unit (CPU), the computer program code, when executed, structured to cause the GPU and the CPU to be configured to:

generate, by the CPU, a known-good result associated with an operation of the GPU, and instructing a GPU engine of the GPU to generate a test image that includes a test result;

generate, by the GPU engine of the GPU, the test image including the test result according to the instruction from the CPU, and writing the test image including the test result to the video memory; and transfer, by the CPU, the test image from the video memory to a system memory, comparing the known-good result to the test result, and writing a result to the system memory indicating failure when the comparison indicates that the test result does not match the known-good result.

\* \* \* \* \*